United States Patent [19]

Shinozake et al.

[11] Patent Number: 4,673,052
[45] Date of Patent: Jun. 16, 1987

[54] MOTORCYCLE HOUSING EXHAUST SYSTEM

[75] Inventors: Takashi Shinozake; Satoshi Ishikawa, both of Saitama, Japan

[73] Assignee: Honda Giken Kogyo Kabushiki Kaisha, Tokyo, Japan

[21] Appl. No.: 536,250

[22] Filed: Sep. 27, 1983

[30] Foreign Application Priority Data

Sep. 29, 1982 [JP] Japan .............. 57-147827[U]
Sep. 29, 1982 [JP] Japan ................. 57-170215
Sep. 29, 1982 [JP] Japan .............. 57-147825[U]

[51] Int. Cl.⁴ .............................................. B60K 13/04
[52] U.S. Cl. ..................................... 180/219; 60/313; 123/55 VF; 181/238; 181/240; 280/291
[58] Field of Search ............ 180/219, 225, 227, 69.22, 180/69.23, 218, 296; 280/283, 284, 285, 286, 288, 291; 60/313; 123/55 VF, 56 AA, 56 BA; 181/238, 239, 240, 211

[56] References Cited

U.S. PATENT DOCUMENTS 2,604,336  7/1952  Seddon et al. ............ 280/284
4,226,296 10/1980  Higaki ...................... 180/219
4,327,811  5/1982  Isaka ........................ 180/219
4,359,126 11/1982  Aiba ......................... 180/219
4,428,451  1/1984  Yamaoka ................ 181/240 X

FOREIGN PATENT DOCUMENTS 2533633  3/1984  France ..................... 180/229
47217    3/1982  Japan ........................ 60/313
2052412  1/1981  United Kingdom ...... 180/219

Primary Examiner—John J. Love
Assistant Examiner—Mitchell J. Hill
Attorney, Agent, or Firm—Lyon & Lyon

[57] ABSTRACT

A motorcycle having exhaust pipes of equal length and a V-type engine having a front and rear cylinder block. The exhaust pipe associated with the front cylinder block extending directly back to above the rear suspension mount. The exhaust pipe associated with the rear cylinder block extends downwardly to beneath and around the rear suspension mount and then upwardly to above the rear suspension mount. Both exhaust pipes terminate above the rear suspension mount to connect with mufflers which extend upwardly and rearwardly adjacent to the back stay structure. The exhaust muffler systems are fixed to the back stay structure adjacent the aft end thereof. Pillion step brackets are fixed at the intersections of the back stay structure with the center frame members to insure appropriate strength in both the mounting and remaining in the frame.

11 Claims, 8 Drawing Figures

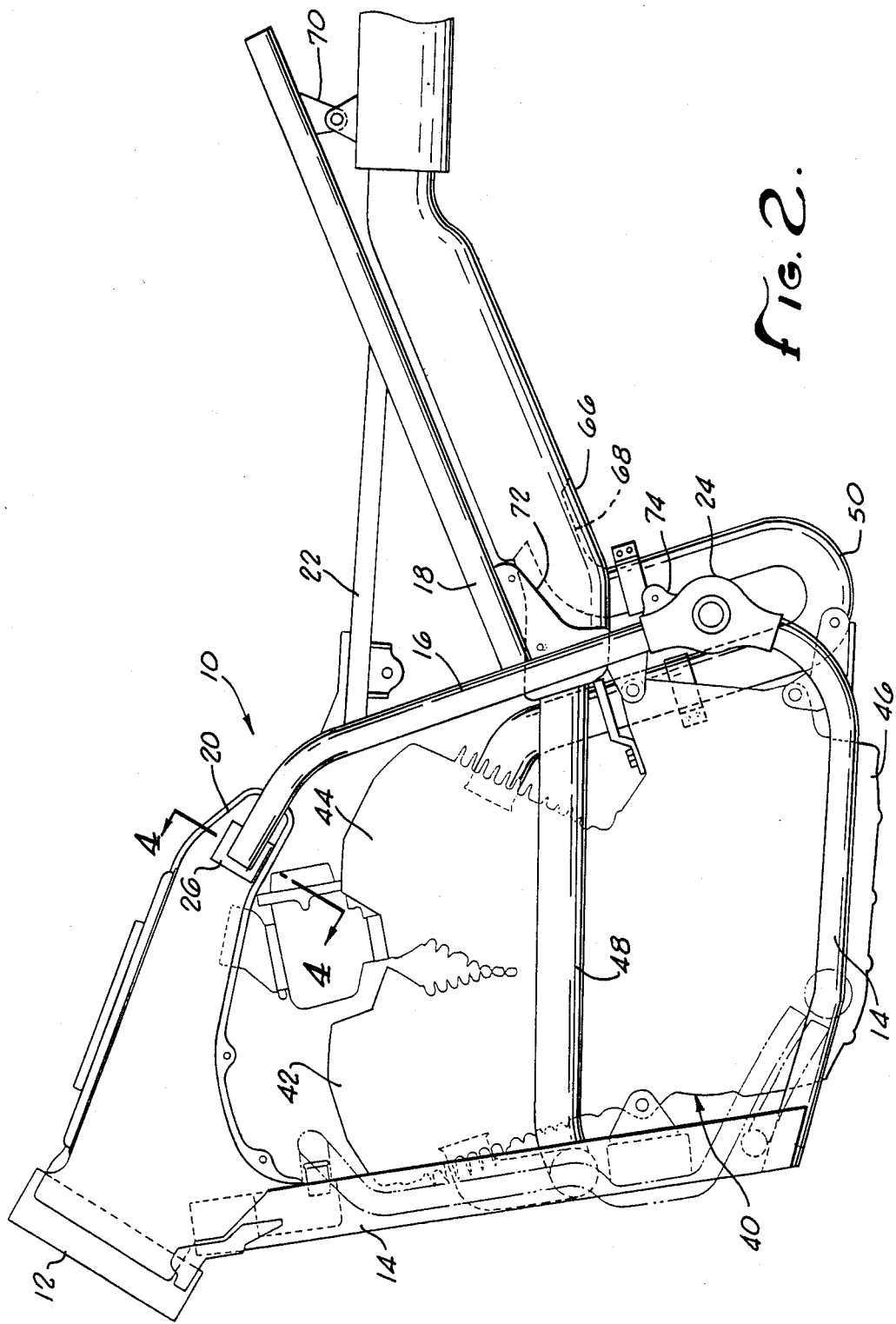

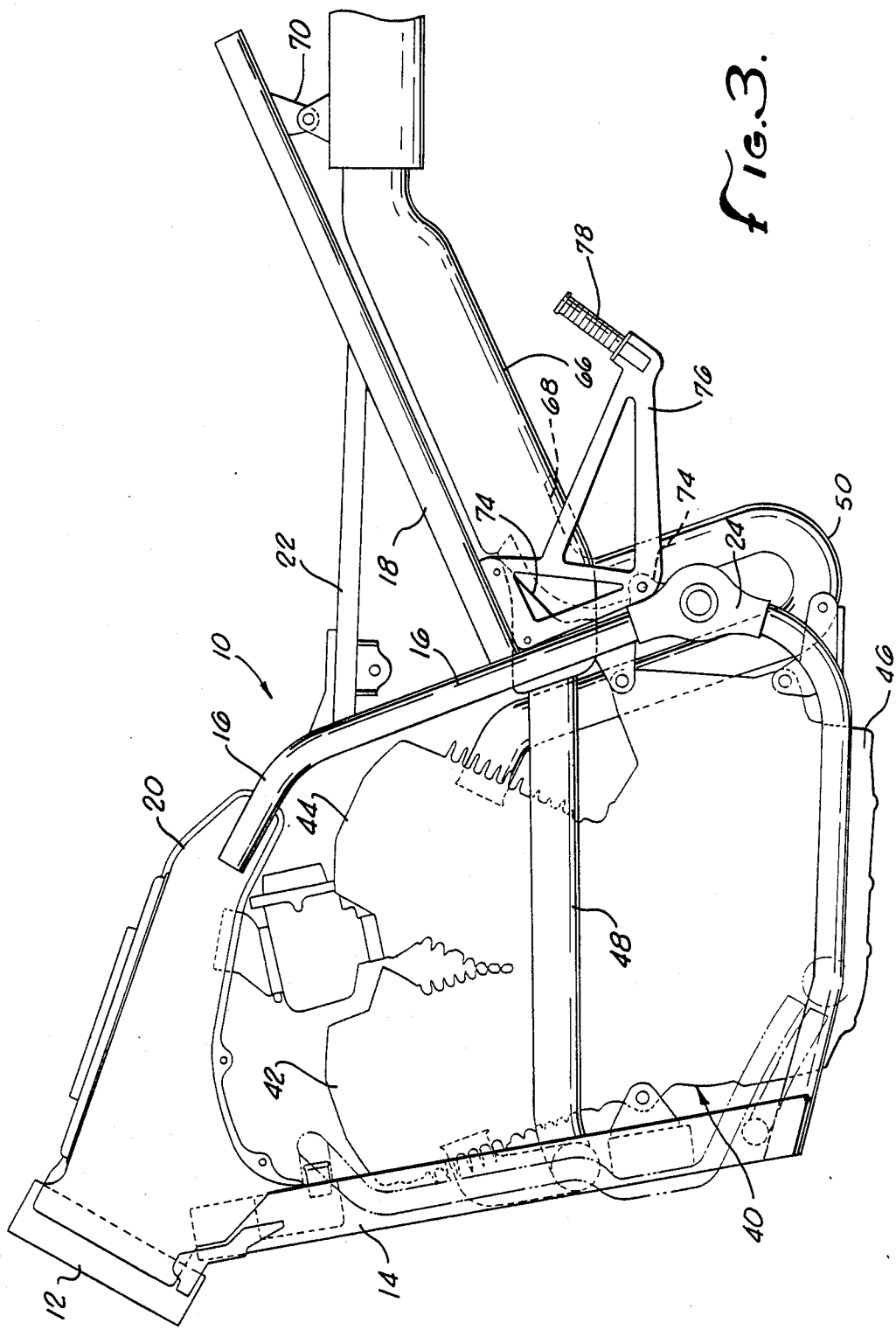

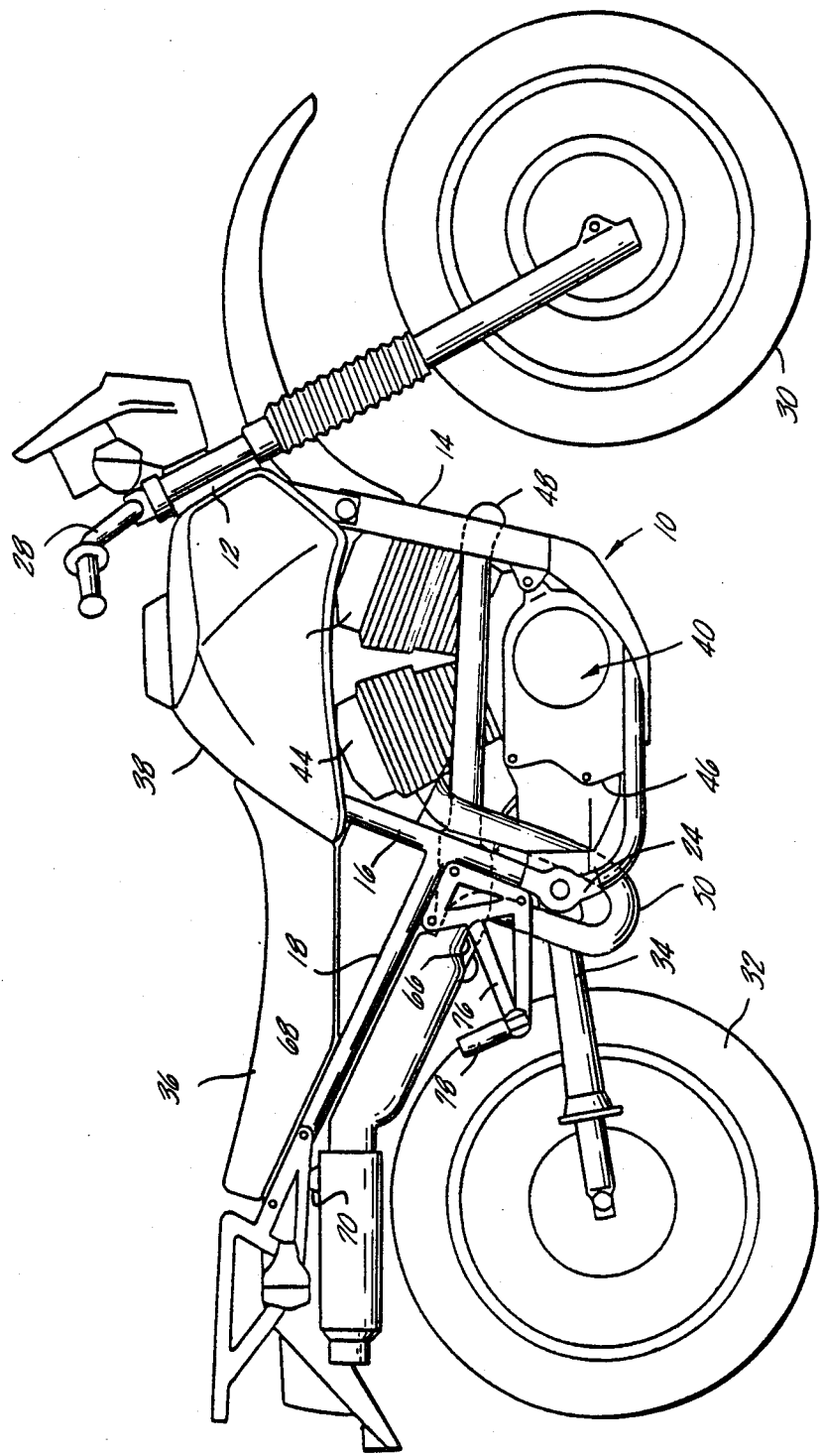

MOTORCYCLE HOUSING EXHAUST SYSTEM

BACKGROUND OF THE INVENTION

The field of the present invention is motorcycles and the structure and exhaust systems therefor.

Motorcycles require generally compact structure and design for all components to insure a compact overall assembly. Somewhat in conflict with the requirement for compactness is the advantageous arrangement of the exhaust pipes to have each pipe extending from a cylinder or cylinders be of equal length. With multicylinder V-type engines with a forward cylinder block and a rear cylinder block, the exhaust ports from the blocks are widely separated. Additionally, it is desirable to have the exhaust from the engine directed aft behind the rider or riders. As a result, the exhaust from the forward engine block must travel a substantially greater horizontal distance than the exhaust from the rear engine block. This arrangement is detrimental to a system having equal length exhaust pipes.

In conjunction with the compact motorcycle design, the exhaust system is desirably placed so that it is not extending laterally in a manner which would interfere with or come too close to the legs of the rider or riders. Often, the exhaust is directed low on the vehicle to avoid any such interference. Once again, such arrangements restrict the ability of the exhaust system to accommodate equal length exhaust passages.

The frames of motorcycles must also be designed for compactness and compatibility with the equipment fixed thereon. Generally extending from the head pipe is a main frame member and a down tube or down tubes. These elements are connected behind the engine by center frame members extending to a mount for the rear suspension. A back stay structure extends from the center frame upwardly and rearwardly to support rear frame members which in turn support the seat and provide an attachment for the rear suspension cushion members. The exhaust systems must extend around or below such a structure. Additionally, mechanical elements must be fixed to the frame for support. This includes the exhaust system as well as the engine, the seat and the like. Pillion steps for a passenger often are fixed to the back stay structure of the motorcycle. Such structural attachments must be securely and rigidly fixed in position. The addition of such elements can result in reduced structural strength of the frame member to which it is welded or otherwise affixed. Consequently, it is necessary to provide a truly integrated motorcycle design to achieve appropriate strength, compactness and function.

SUMMARY OF THE INVENTION

The present invention pertains to motorcycles particularly of the multicylinder V-type engine arrangement. Substantially equal length exhaust paths to a muffler system may be achieved through the proper orientation of the exhaust pipes extending from the cylinder blocks. The forward cylinder block may include a pipe extending rearwardly to above the rear suspension mount. An exhaust pipe from the rear block may extend in a U-shaped configuration to below and around the mount of the rear suspension. The muffler system is arranged to extend upwardly and rearwardly adjacent to the back stay structure. Mufflers may be fixed to the exhaust pipes at such locations so as to create uniform exhaust path lengths.

The exhaust pipes may be arranged so that they are generally inboard of the lateral extremities of the frame structure. To this end, the exhaust pipes extend between or below the center frame members to meet with the muffler system. The mufflers themselves may be fixed at a rear portion thereof to the back stays.

To insure maximum structural integrity of the back stay structure, the pillion step brackets may be mounted to both the back stay and the center frame members adjacent the intersection thereof providing a convenient attachment which may in fact add strength to the frame structure.

Accordingly, it is an object of the present invention to provide an improved motorcycle design including both exhaust and structural considerations. Other and further objects and advantages will appear hereinafter.

BRIEF DESCRIPTION OF THE DRAWINGS

FIG. 2 is a detail side elevation of the center frame area and exhaust.

FIG. 3 is a detail side elevation similar to that of FIG. 2 illustrating a pillion step bracket.

FIG. 7 is a detail side elevation of the center frame area and exhaust.

DETAILED DESCRIPTION OF THE PREFERRED EMBODIMENT

Figure 1:
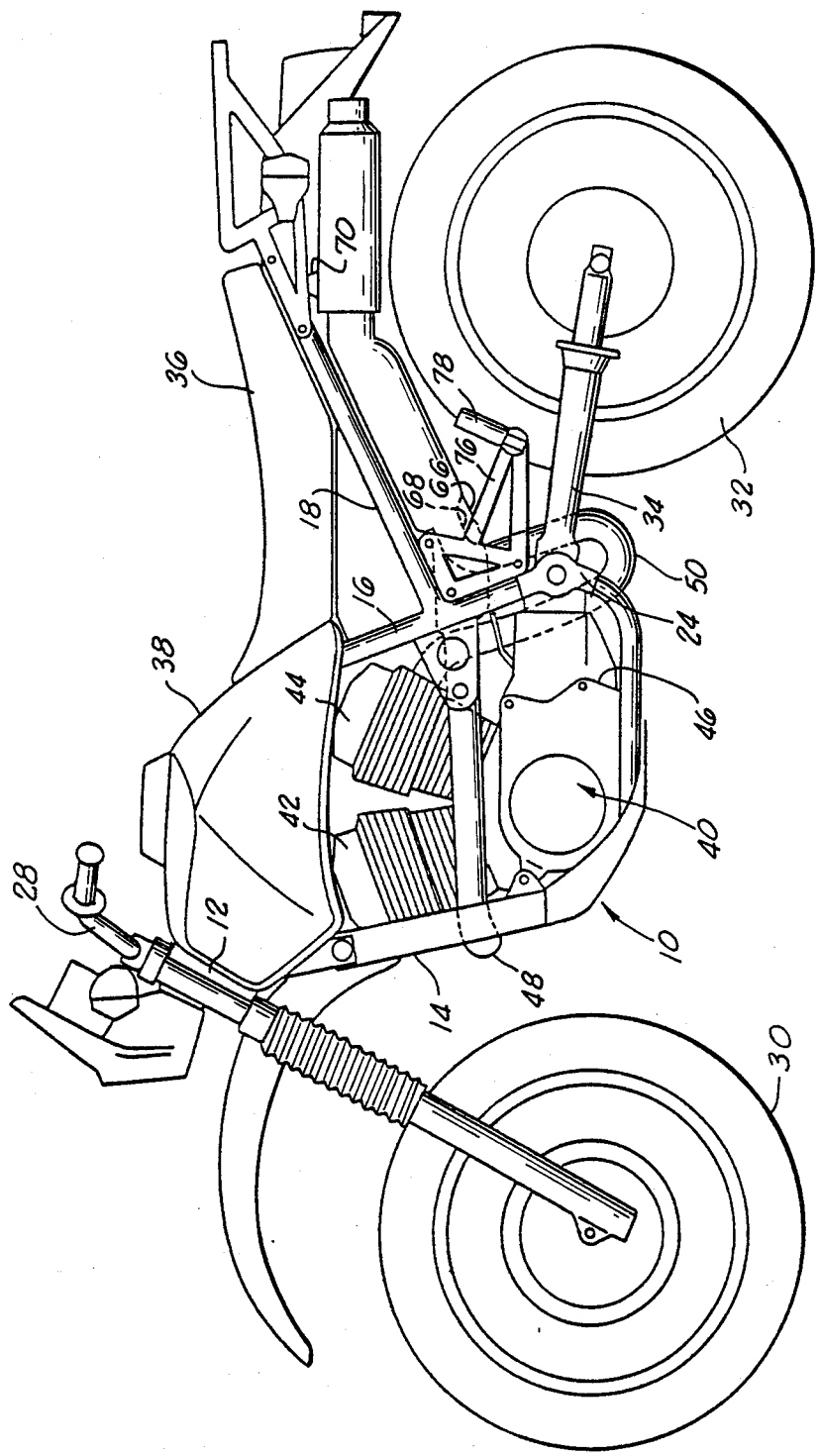
FIG. 1 is a side elevation of a motorcycle of the present invention.
Figure 6:
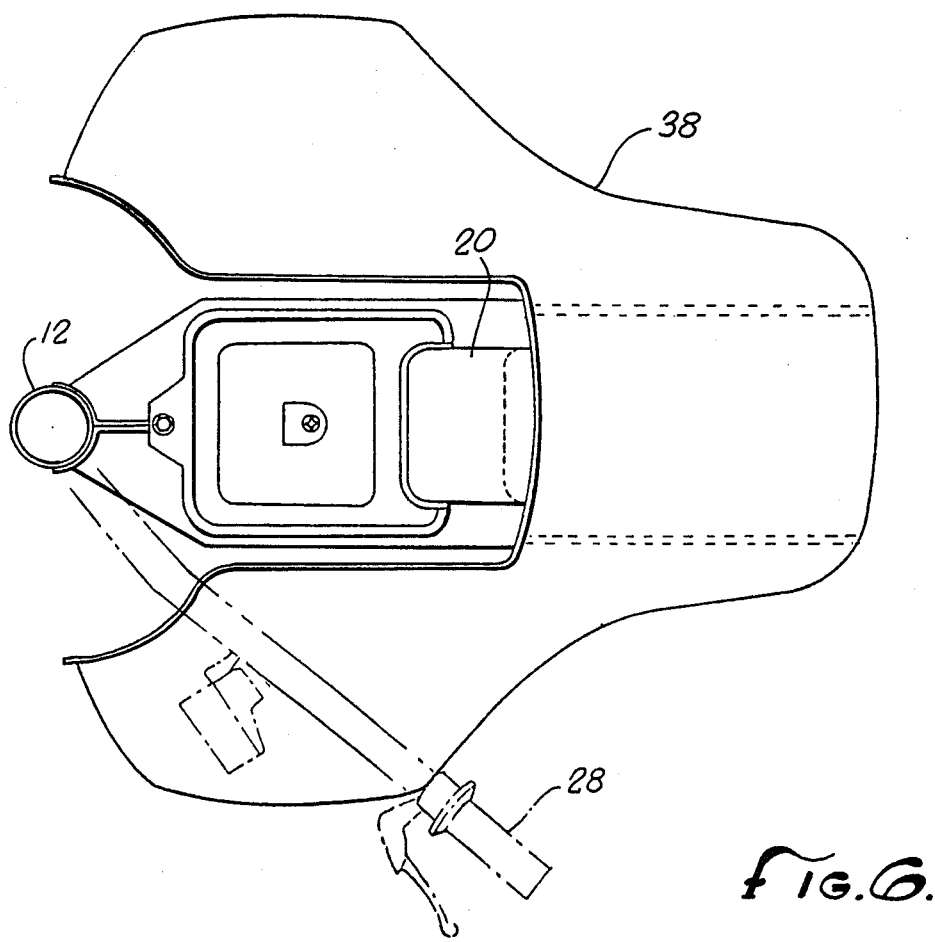
FIG. 6 is a plan view of the forward portion of the motorcycle.
Figure 4:
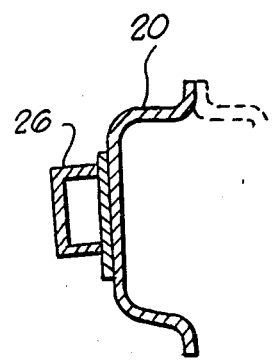
FIG. 4 is a cross-sectional view taken along line 4—4 of FIG. 2.

Turning in detail to the drawings, FIG. 1 illustrates a motorcycle incorporating the present invention. The motorcycle includes a frame, generally designated 10 including a head pipe 12, a down tube assembly 14, a center frame assembly 16, a back stay structure 18, a main frame structure 20 and a rear frame structure 22. The down tube assembly 14 extends rearwardly defining an undercarriage to a rear suspension mount 24. In this embodiment, the down tube assembly 14, the center frame assembly 16, the back stay structure 18 and the rear frame structure 22 each include two members extending in roughly parallel orientation. The arrangement of the main frame structure 20 can be seen in FIG. 4 as being a composite structure having brackets 26 positioned on the side of the structure 20 for attachment of the center frame members of the assembly 16.

The motorcycle further includes a steering and front suspension assembly 28 supporting a front wheel 30. A rear wheel 32 is mounted to a rear suspension assembly 34 extending to the rear suspension mount 24 where it is pivotally mounted. Cushion assemblies (not shown) control the motion of the rear suspension assembly 34 and may be conventionally fixed to the frame 10. A seat 36 is arranged on the rear frame structure 22 and a gas tank 38 is arranged ahead of the seat 36 on the main frame structure 20.

Positioned within the frame structure defined by the down tube assembly 14, the center frame assembly 16 and the main frame structure 20 is an engine and drive train assembly 40 which is shown to be of the V-type having cylinder block 42 and 44. The cylinder blocks 42 and 44 are arranged in a V with the cylinder block 42 being forward of the cylinder block 44. The lower portion of the engine and drive train assembly 40 includes the crankcase and transmission 46.

An exhaust system is associated with the engine 40 including a first exhaust pipe 48 and a second exhaust pipe 50. The first exhaust pipe 48 extends from the forward portion of the cylinder block 42, the traditional location of the exhaust port or ports in a V-type engine. The exhaust pipe 48 then extends directly aft in a horizontal manner beside the engine 40, inwardly of one member of the down tube assembly 14 and inwardly of the members of the center frame assembly 16. The direction of the forward exhaust pipe aft as illustrated reduces to a minimum the length of exhaust paths to the rear of the engine 40.

Figure 5:
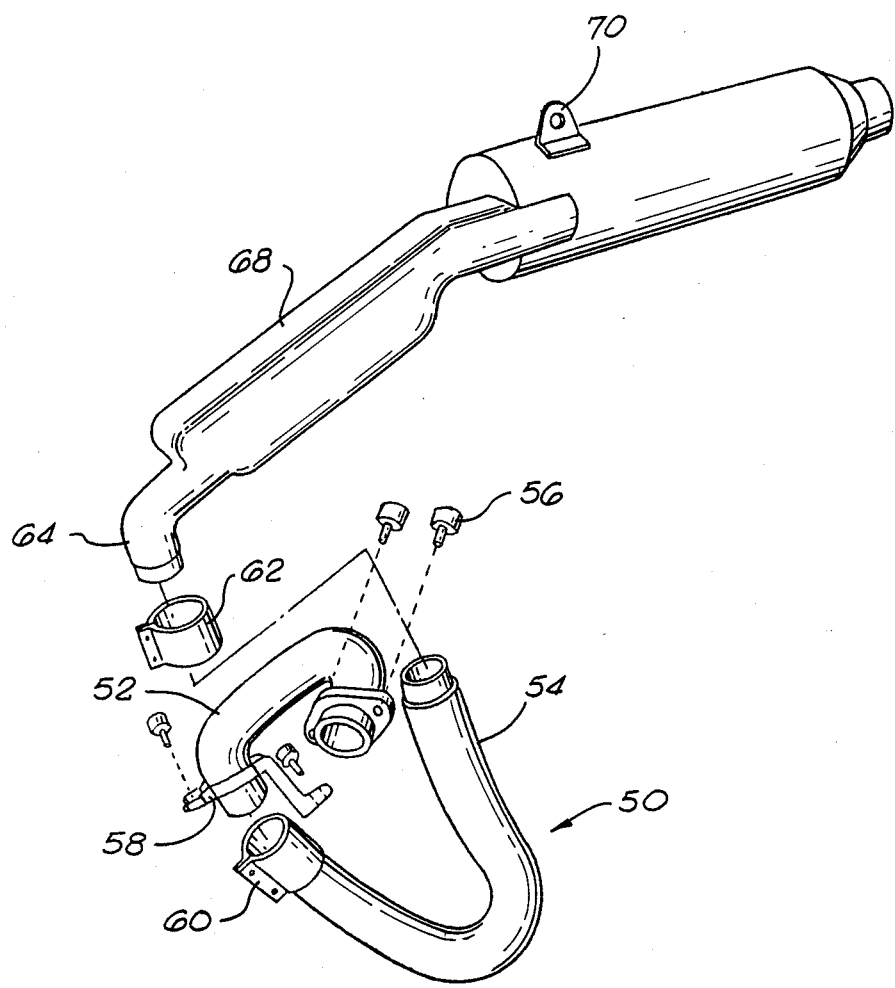
FIG. 5 is an exploded assembly view of an exhaust pipe and muffler of the present system.
Figure 8:
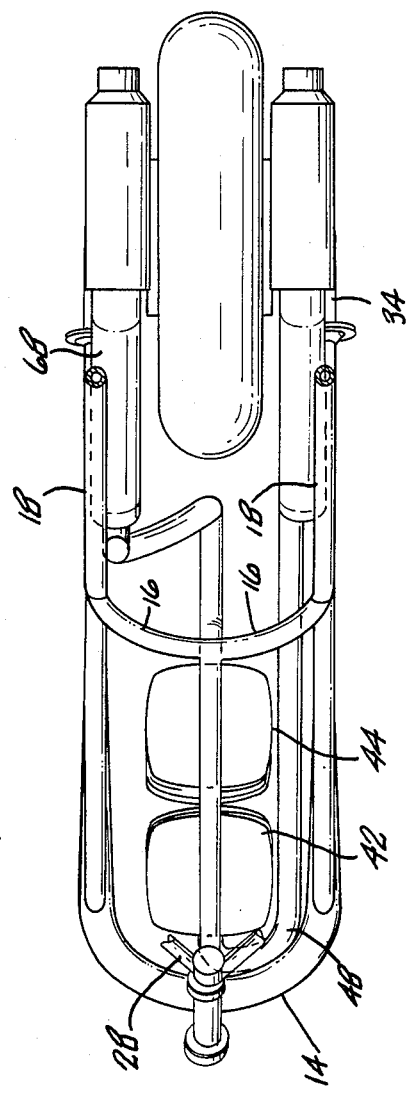
FIG. 8 is a plan view of the frame and exhaust configuration of the motorcycle.

The exhaust pipe 50 extends from the rear of the cylinder block 44, the traditional location for exhaust ports on such a V-type engine. The exhaust pipe 50 then extends downwardly to a location beneath the rear suspension mount 24 and then upwardly behind the rear suspension mount 24 to a location above the mount. In this way, a U-shaped section of the exhaust pipe 50 extends through a space not normally otherwise occupied. FIG. 5 better illustrates the assembly which may be employed for the exhaust pipe 50. For convenience of fabrication, the exhaust pipe 50 is divided into two sections, a first section 52 and a second section 54. The first section 52 is connected to the cylinder block 44 by means of screws 56. The section 52 extends in a circuitous path from the block 44 to discharge downwardly at a central location. A bracket 58 aids in the support of the exhaust pipe 50 and is fixed to the engine and drive train assembly 40. The second section 54 of the exhaust pipe 50 is associated with the first section 52 by means of a connection band 60. It is this second section 54 which extends downwardly to beneath and then upwardly behind the rear suspension mount 24. An additional band 62 then fixes the back end of the exhaust pipe 50 and inlet 64 to the muffler.

The exhaust pipes 48 and 50 are arranged, through the direct passage of exhaust pipe 48 and the circuitous passage of exhaust pipe 50, to have equal length. Consequently, the complex effects of the length of the exhaust pipe are equalized between cylinders.

Extending from the exhaust pipes 48 and 50 is a means for muffling the intense sound transmitted through the exhaust pipes 48 and 50. To this end, each exhaust pipe 48 and 50 includes a muffler 66 and 68. Each muffler 66 and 68 connects with the respective exhaust pipe 48 and 50 above the rear suspension mount 24. Each muffler 66 and 68 also extends upwardly and rearwardly adjacent the back stay structure 18. With two structure elements which are parallel, a muffler is adjacent each structural element. The muffler then extends rearwardly at a rear section which is fixed to the back stay structure at 70. This muffler arrangement also employs an area not specifically dedicated to other mechanisms. The mufflers 66 and 68 may be positioned inwardly so as to avoid interference with the legs of a rider or passenger and yet are preferably separated to avoid the upward motion of the rear wheels 32.

At the intersection of the back stay 18 and the center frame member 16 on each side of the motorcycle, a bracket 72 is welded in place. The bracket 72 is best seen in FIG. 2. An additional attachment 74 is positioned adjacent the rear suspension mount 24. A pillion step bracket 76 is then mounted to the brackets 72 and 74 by means of bolts at three locations as can be seen in FIG. 3. The location of the pillion step bracket 76 at the junction of the back stay 18 and the center frame member 16 enables the supporting bracket to be positioned at a strong location. Furthermore, the bracket located within this point of intersection may additionally aid in the strengthening of the frame structure. A pillion step 78 is pivotally mounted to the pillion step bracket 76 so that it may be pivoted from or to its extended position.

Thus, an improved motorcycle design incorporating equal length exhaust pipes made possible by the orientation of each of the exhaust pipes is disclosed. A pillion step bracket is also shown to be employed for convenience and strength. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A motorcycle comprising
   a frame including a rear suspension mount and an upwardly and rearwardly extending back stay structure;
   a V-type multicylinder engine having a front cylinder block and a rear cylinder block; and
   an exhaust system including an exhaust pipe extending rearwardly to above said rear suspension mount from said front cylinder block and a muffler connected to said exhaust pipe above said rear suspension mount, said muffler extending upwardly and rearwardly adjacent said back stay structure, the rear of said muffler being fixed to said back stay structure.

2. The motorcycle of claim 1 wherein said frame further includes center frame members extending downwardly to said rear suspension mount, said exhaust pipe extending between said center frame members.

3. A motorcycle comprising
   a frame including a rear suspension mount and an upwardly and rearwardly extending back stay structure;
   a V-type multicylinder engine having a front cylinder block and a rear cylinder block; and
   an exhaust system including an exhaust pipe extending from said rear cylinder block, downwardly in front of and beneath said rear suspension mount and then upwardly behind said rear suspension mount and a muffler connected to said exhaust pipe above said rear suspension mount upwardly and rearwardly adjacent said back stay structure, the rear of said muffler being fixed to said back stay structure.

4. The motorcycle of claim 3 wherein said exhaust pipe includes a U-shaped portion extending around said rear suspension mount.

5. A motorcycle comprising
   a frame including a rear suspension mount and an upwardly and rearwardly extending back stay structure;
   a V-type multicyclinder engine having a front cylinder block and a rear cylinder block; and
   an exhaust system including a first exhaust pipe extending rearwardly to above said rear suspension mount from said front cylinder block, a second exhaust pipe extending from said rear cylinder block downwardly in front of and beneath said rear suspension mount and then upwardly behind said rear suspension mount in a U-shape portion, and muffler means for muffling the exhaust from said first and second exhaust pipes, said muffler means extending upwardly and rearwardly adjacent said back stay structure from above said mount.

6. The motorcycle of claim 5 wherein said muffler means includes two mufflers extending in parallel.

7. The motorcycle of claim 5 wherein said frame further includes center frame members extending downwardly to said rear suspension mount, said first exhaust pipe extending between said center frame members and said second exhaust pipe extending downwardly below said rear suspension mount.

8. The motorcycle of claim 7 wherein said back stay structure includes two parallel back stays.

9. The motorcycle of claim 8 wherein one of said back stays and one of said center frame members intersect, the motorcycle further comprising a pillion step bracket fixed to one center frame member and said one back stay adjacent the intersection thereof.

10. The motorcycle of claim 9 wherein the other of said back stays and the other of said center frame members intersect, the motorcycle further comprising a pillion step bracket fixed to said other center frame member and said other back stay adjacent the intersection thereof.

11. The motorcycle of claim 5 wherein said first and second exhaust pipes are equal in length.

* * * * *

UNITED STATES PATENT AND TRADEMARK OFFICE
CERTIFICATE OF CORRECTION

PATENT NO. : 4,673,052

DATED : June 16, 1987

INVENTOR(S) : Takashi Shinozaki et al.

It is certified that error appears in the above-identified patent and that said Letters Patent are hereby corrected as shown below:

On the Title Page, Item [75]

Please correct the last name of the first inventor "Shinozake" to -- Shinozaki --.

On the Title Page, Item [54]

Please correct the title of the invention "MOTORCYCLE HOUSING EXHAUST SYSTEM" to -- MOTORCYCLE HAVING EXHAUST SYSTEM --.

Signed and Sealed this

Thirty-first Day of May, 1988

Attest:

DONALD J. QUIGG

*Attesting Officer*  *Commissioner of Patents and Trademarks*